(12) United States Patent
Yamauchi et al.

(10) Patent No.: US 8,248,593 B2
(45) Date of Patent: Aug. 21, 2012

(54) INTERFERENCE MEASURING DEVICE

(75) Inventors: Toyohiko Yamauchi, Hamamatsu (JP); Hidenao Iwai, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 173 days.

(21) Appl. No.: 12/742,802

(22) PCT Filed: Nov. 11, 2008

(86) PCT No.: PCT/JP2008/070502
§ 371 (c)(1),
(2), (4) Date: Jul. 9, 2010

(87) PCT Pub. No.: WO2009/063863
PCT Pub. Date: May 22, 2009

(65) Prior Publication Data
US 2010/0309479 A1 Dec. 9, 2010

(30) Foreign Application Priority Data

Nov. 16, 2007 (JP) ................................. 2007-298019

(51) Int. Cl.
*G01N 21/00* (2006.01)
(52) U.S. Cl. .................................................. 356/237.2
(58) Field of Classification Search ......................... None
See application file for complete search history.

(56) References Cited

U.S. PATENT DOCUMENTS 4,818,108 A * 4/1989 Eppinger ....................... 356/513
5,875,031 A * 2/1999 Owa ............................. 356/500

FOREIGN PATENT DOCUMENTS

| JP | 6-508205 | 9/1994 |
| JP | 2001-66122 | 3/2001 |
| JP | 2005-283387 | 10/2005 |

* cited by examiner

*Primary Examiner* — Tu Nguyen
(74) *Attorney, Agent, or Firm* — Drinker Biddle & Reath LLP

(57) ABSTRACT

An interference measuring device comprises light sources lenses, an aperture, an optical multiplexer, an optical branching filter, a half mirror, an imaging unit, an analyzing unit, a light receiving unit, a displacement detecting unit, a piezoelectric actuator, a drive unit, a mirror, a stage, a drive unit, and a control unit. According to a result of optical path length difference detection by the displacement detecting unit, the control unit controls optical path length difference adjusting operations by the piezoelectric actuator and stage through the drive units such that the optical path length difference becomes a plurality of target values in sequence. The control unit subjects the moving operation by the piezoelectric actuator to a feedback control such that the optical path length difference becomes each of the target values upon the moving operation by the stage as well.

4 Claims, 12 Drawing Sheets

INTERFERENCE MEASURING DEVICE

TECHNICAL FIELD

The present invention relates to an interference measuring device equipped with an interference optical system.

BACKGROUND ART

As interference measuring devices equipped with interference optical systems, those disclosed in Patent Literatures 1 and 2 have been known. Each of the devices disclosed in these literatures splits light outputted from a light source into two, so as to output first and second branched beams, causes a first reflected beam occurring when the first branched beam is reflected by a first subject and a second reflected beam occurring when the second branched beam is reflected by a second subject to interfere with each other, and detects the intensity of thus interfering light with a detecting unit.

The device disclosed in Patent Literature 1, in which one of the first and second subjects is a reflecting mirror while the other is a film-like object to be measured, measures the thickness of the object to be measured. For this purpose, the device roughly adjusts an optical path length L1 from the light source to the detecting unit by way of the first subject with a stepping motor, finely adjusts an optical path L2 from the light source to the detecting unit by way of the second subject with a piezoelectric actuator, determines two positions where the interfering light intensity detected by the detecting unit is peaked, and measures the thickness of the object to be measured from these two positions.

The device disclosed in Patent Literature 2, in which one of the first and second subjects is a reflecting mirror while the other is a film-like object to be measured, measures the surface form of the object to be measured. For this purpose, the device sets the difference (optical path length difference) between optical path lengths L1, L2 to a plurality of target values in sequence, captures respective interference patterns occurring when the optical path length difference is set to the target values with an imaging unit, and measures the surface form of the object to be measured according to thus captured interference patterns. In order for the imaging unit to capture the interference patterns, an imaging optical system which focuses the interfering light outputted from an interference optical system onto an imaging surface of the imaging unit is used.

Patent Literature 1: Japanese Patent Application Laid-Open No. 2005-283387

Patent Literature 2: Japanese Patent Application Laid-Open No. 2001-066122

DISCLOSURE OF INVENTION

Technical Problem

In interference measuring devices for measuring the surface form of the object to be measured such as the one disclosed in Patent Literature 2 mentioned above, in order to measure the surface form highly accurately, it is necessary for the actual optical path length difference "L1−L2" to match each target value with a high accuracy, for which it is desirable that the optical path length difference be adjusted by a piezoelectric actuator. For achieving a greater dynamic range in the surface form measurement, it is desirable that the range for adjusting the optical path length difference be wider.

When adjusting the optical path length difference with a piezoelectric actuator, however, the range in which the piezoelectric actuator operates is only several μm, whereby the range for adjusting the optical path length difference is narrow. Therefore, when adjusting the optical path length difference with a piezoelectric actuator alone, the surface form of the object to be measured is hard to measure in a wide dynamic range with a high accuracy.

For increasing the dynamic range of surface form measurement, the subject, the piezoelectric actuator, and a part of the imaging optical system (e.g., a lens) may be mounted on a stage which is movable by a stepping motor, and the subject and a part of the imaging optical system may integrally be moved by the piezoelectric actuator on the stage. It is expected in this case that the dynamic range of surface form measurement can be widened by a moving operation by the stage, while the accuracy in surface form measurement can be enhanced by a moving operation by the piezoelectric actuator. However, such a piezoelectric actuator does not have such a response speed as to move the object and a part of the imaging optical system integrally and enable a feedback control of mechanical vibrations of the optical system.

For eliminating the problems mentioned above, it is an object of the present invention to provide an interference measuring device which can measure the surface form of an object to be measured in a wide dynamic range with a high accuracy.

Solution to Problem

The interference measuring device in accordance with the present invention comprises (1) a light source for outputting light; (2) an interference optical system for splitting the light outputted from the light source into two, so as to output first and second branched beams, inputting a first reflected beam occurring when the first branched beam is reflected by a first subject and a second reflected beam occurring when the second branched beam is reflected by a second subject, and causing the first and second reflected beams to interfere with each other, so as to output thus interfering light; (3) an imaging optical system for focusing the interfering light outputted from the interference optical system; (4) an imaging unit for detecting an interference pattern of the interfering light focused by the imaging optical system; (5) optical path length difference detecting means for detecting an optical path length difference between an optical path length from the light source to the imaging unit by way of the first subject and an optical path length from the light source to the imaging unit by way of the second subject; (6) optical path length difference adjusting means for adjusting the optical path length difference; and (7) a control unit for controlling an optical path length difference adjusting operation by the optical path length difference adjusting means such that the optical path length difference becomes a plurality of target values in sequence according to a result of the optical path length difference detection by the optical path length difference detecting means.

In the interference measuring device in accordance with the present invention, the optical path length difference adjusting means includes first moving means for moving the first subject and second moving means for moving the second subject and adjusts the optical path length difference by a moving operation by the first or second moving means. The first moving means has an operating range narrower than that of the second moving means and a positional accuracy higher than that of the second moving means. The second moving means moves the second subject while keeping an optical system between the interference optical system and the second subject. The control unit causes the second moving means to perform the moving operation continuously or intermittently such that an amount of movement by the first moving means falls within a predetermined range within the operating range at each of the plurality of target values, and subjects the moving operation by the first moving means to a feedback control such that the optical path length difference becomes each target value upon the moving operation by the second moving means as well according to the result of the optical path length difference detection by the optical path length difference detecting means. When moving the second subject while keeping the optical system between the interference optical system and the second subject, the second moving means keeps a distance to a focal plane on the second subject side measured from the interference optical system.

Letting L1 be the optical path length from the light source to the imaging unit by way of the first subject, and L2 be the optical path length from the light source to the imaging unit by way of the second subject, the "optical path length difference" may be represented by their difference "L1−L2" or an amount of change relative to a given reference value.

Preferably, in the case of causing the second moving means to perform the moving operation continuously, the control unit (a) causes the first moving means to perform the moving operation stepwise when the optical path length difference shifts from a given target value to the next target value and (b), in a period when the optical path length difference is set to a given target value, subjects the moving operation by the first moving means to a feedback control such that the optical path length difference becomes the target value. More preferably in this case, before the optical path length difference shifts from a given target value to the next target value, when an amount of movement by the first moving means deviates from a predetermined range at the target value after the shifting, the control unit adjusts a speed of the moving operation by the second moving means such that the amount of movement falls within the predetermined range.

Preferably, in the interference measuring device in accordance with the present invention, the control unit causes the first moving means to perform the moving operation stepwise when the optical path length difference shifts from a given target value to the next target value and, when the amount of movement by the first moving means deviates from a predetermined range within the operating range, causes the second moving means to perform the moving operation intermittently such that the amount of movement falls within the predetermined range, while subjecting the moving operation by the first moving means to a feedback control such that the optical path length difference becomes each target value during the moving operation by the second moving means as well.

Advantageous Effects of Invention

The present invention can measure the surface form of the object to be measured in a wide dynamic range with a high accuracy.

REFERENCE SIGNS LIST

1 . . . interference measuring device; 9 . . . object to be measured; 11, 12 . . . light source; 21 to 25 . . . lens; 31 . . . aperture; 41 . . . optical multiplexer; 42 . . . optical branching filter; 43 . . . half mirror; 51 . . . imaging unit; 52 . . . analyzing unit; 61 . . . light receiving unit; 62 . . . displacement detecting unit; 71 . . . piezoelectric actuator; 72 . . . drive unit; 73 . . . mirror; 81 . . . stage; 82 . . . drive unit; 90 . . . control unit

DESCRIPTION OF EMBODIMENTS

In the following, best modes for carrying out the present invention will be explained in detail with reference to the accompanying drawings. In the explanation of the drawings, the same constituents will be referred to with the same signs while omitting their overlapping descriptions.

Figure 1:
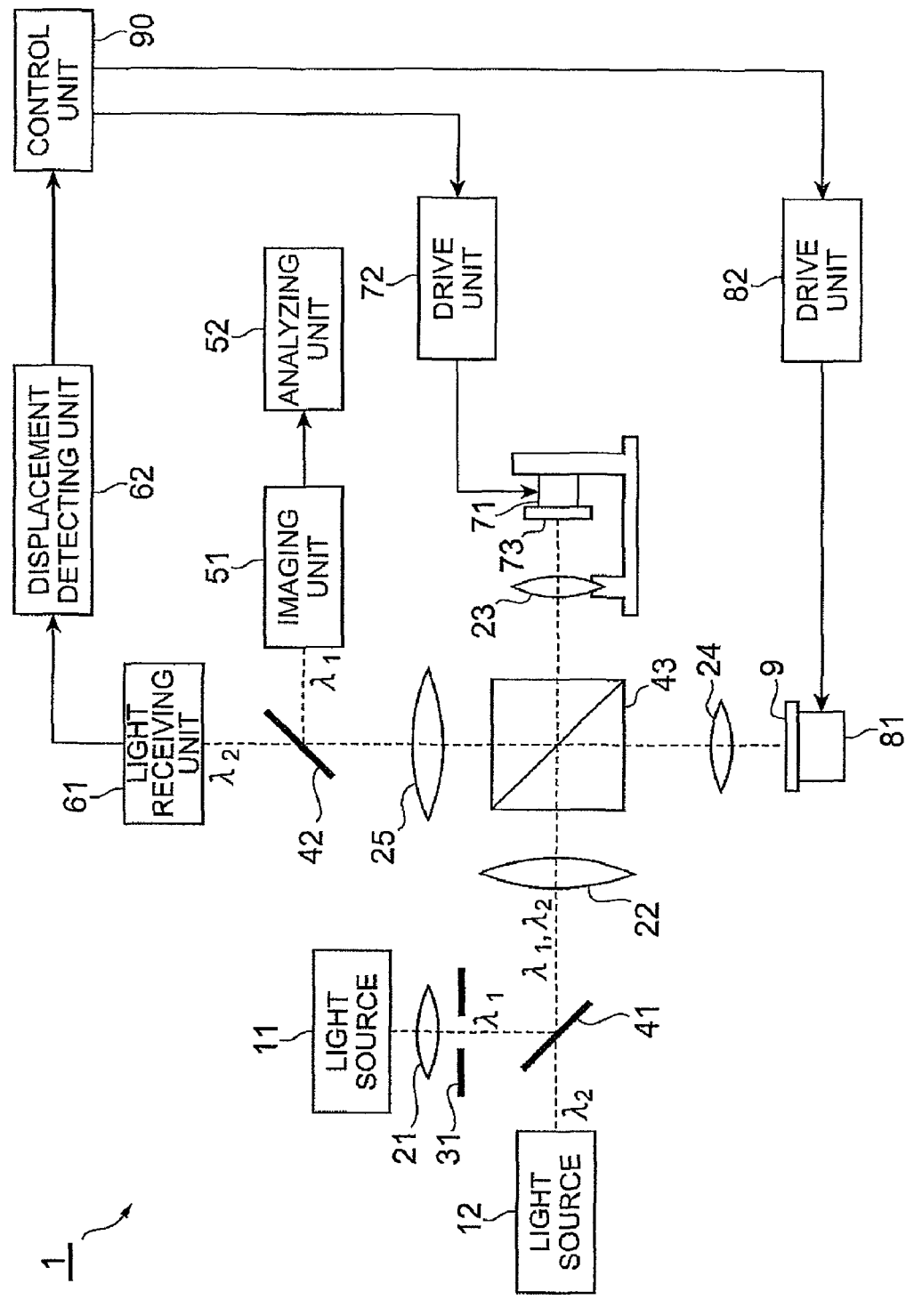
FIG. 1 is a structural diagram of an interference measuring device 1 in accordance with an embodiment.

FIG. 1 is a structural diagram of an interference measuring device 1 in accordance with an embodiment. The interference measuring device 1 illustrated in this drawing, which measures the surface form of an object to be measured 9, comprises light sources 11, 12, lenses 21 to 25, an aperture 31, an optical multiplexer 41, an optical branching filter 42, a half mirror 43, an imaging unit 51, an analyzing unit 52, a light receiving unit 61, a displacement detecting unit 62, a piezoelectric actuator 71, a drive unit 72, a mirror 73, a stage 81, a drive unit 82, and a control unit 90.

The light source 11, e.g., a tungsten lamp capable of outputting wideband light in a wavelength band of 600 nm to 900 nm, outputs light $\lambda_1$ having a relatively short coherent length. On the other hand, the light source 12, e.g., a semiconductor laser light source capable of outputting a laser beam having a wavelength of 1.31 μm, outputs light $\lambda_2$ having a relatively long coherent length. The optical multiplexer 41 reflects the light $\lambda_1$ arriving there through the lens 21 and aperture 31 after issuing from the light source 11, transmits there through the light $\lambda_2$ arriving there after issuing from the light source 12, combines them together, and outputs thus combined light to the lens 22.

The half mirror 43 splits the light $\lambda_1$, $\lambda_2$ arriving there through the lens 22 after being combined by the optical multiplexer 41 into two as first and second branched beams and outputs the first and second branched beams to the lenses 23, 24, respectively. The half mirror 43 inputs a first reflected beam occurring when the first branched beam is reflected by the mirror 73 through the lens 23 again through the lens 23 and a second reflected beam occurring when the second branched beam is reflected by the object to be measured 9 through the lens 24 again through the lens 24, causes the first and second reflected beams to interfere with each other, and outputs the interfering light to the lens 25. That is, the half mirror 43 is an element constituting an interference optical system.

The optical branching filter 42 inputs the light issuing from the half mirror 43 through the lens 25, reflects the light $\lambda_1$ thereof, so as to output it to the imaging unit 51, and transmits there through the light $\lambda_2$, so as to output it to the light receiving unit 61. The lenses 23 to 25 are elements constituting an imaging optical system for focusing the interfering light $\lambda_1$ branched by the optical branching filter 42 after issuing from the half mirror 43 onto an imaging surface of the imaging unit 51. The imaging unit 51, e.g., a CCD camera, captures interference patterns of thus focused interfering light $\lambda_1$. The light receiving unit 61, e.g., a photodiode, detects the intensity of the light $\lambda_2$ branched by the optical branching filter 42 after issuing from the half mirror 43.

Figure 2:
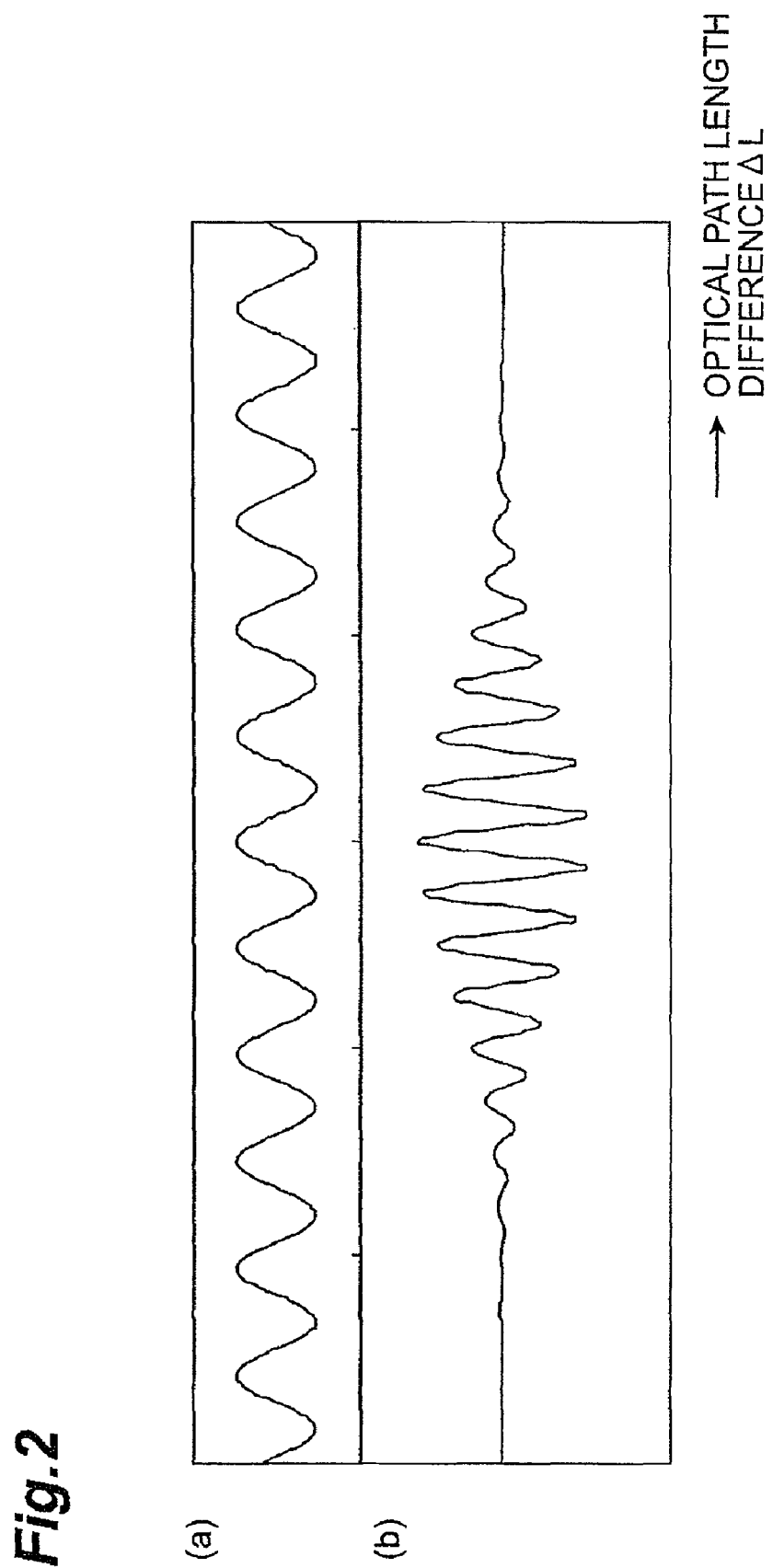
FIG. 2 is a chart illustrating the relationship between the intensity of light reaching an imaging unit 51 or light receiving unit 61 and the optical path length difference.

Let ΔL be the optical path length difference between the optical path length by which light issuing from the half mirror 43 returns there after being reflected by the mirror 73 and the optical path length by which light issuing from the half mirror 43 returns there after being reflected by the object to be measured 9. The light $\lambda_2$ issuing from the light source 12 and reaching the light receiving unit 61 has a relatively long coherent length as mentioned above, so that the intensity of the light $\lambda_2$ reaching the light receiving unit 51 periodically changes within a relatively wide range of optical path length difference ΔL as illustrated in FIG. 2(a). In contrast, the light $\lambda_1$ issuing from the light source 11 and reaching the imaging unit 51 has a relatively short coherent length as mentioned above, so that the intensity of the light $\lambda_1$ reaching the imaging unit 61 periodically changes within a relatively narrow range of optical path length difference ΔL while yielding a greater amplitude of interference as the optical path length difference ΔL is closer to 0 as illustrated in FIG. 2(b).

By utilizing this fact, the analyzing unit 52 acquires respective interference pattern images of the light $\lambda_1$ captured by the imaging unit 51 when the optical path length difference is set to a plurality of target values, determines the optical path length difference by which the amplitude of interference is maximized at each image position according to the plurality of interference pattern images, and obtains the surface form (height distribution) of the object to be measured 9.

Figure 8:
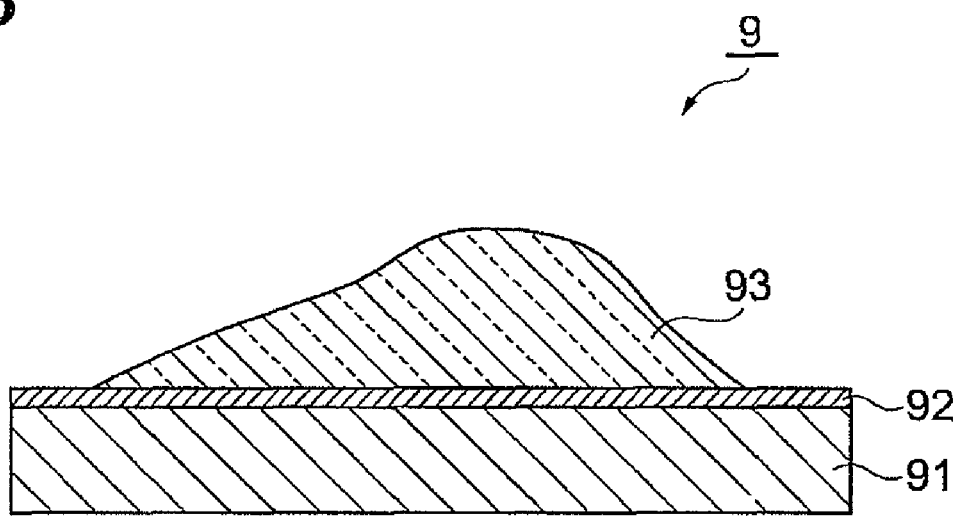
FIG. 8 is a view illustrating a structural example of an object to be measured 9.

Here, the object to be measured 9 is preferably one comprising a thin film 92 formed on a main face of a substantially flat substrate 91 and a semitransparent subject to be measured 93 placed on the thin film 92 as illustrated in FIG. 8, for example. By reflecting the light $\lambda_2$ at a high reflectance, the thin film 92 is favorably used as a reference surface at the time of a feedback control which will be explained later. Preferably, the subject to be measured 93 is a cell.

When the surface form of the object to be measured 9 has minute subwavelength irregularities, the surface form (height distribution) of the object to be measured 9 can be determined by letting $\lambda_{20}$ be the center wavelength of the light $\lambda_2$, acquiring respective interference image patterns while shifting the optical path length difference four times in increments of $\lambda_{20}/4$, and determining a phase offset value of an interference waveform at each image position according to the four interference pattern images.

Height distributions obtained by a method of determining an optical path length difference maximizing the amplitude of interference and a method of determining a phase offset value of an interference waveform may be combined together, so as to acquire the surface form in a wider height range with a subwavelength accuracy.

From the change in the intensity of light $\lambda_2$ detected by the light receiving unit 61, the displacement detecting unit 62 determines the optical path length difference (or amount of change relative to a given reference value). That is, the light source 12, light-receiving unit 61, and displacement detecting unit 62 are elements constituting the optical path length difference detecting means for detecting the optical path length difference. The piezoelectric actuator 71 may impart minute vibrations to the mirror 73, so as to modulate the latter around a given optical path length difference, whereby the optical path length difference can be detected more accurately.

The piezoelectric actuator 71, drive unit 72, stage 81, and drive unit 82 are elements constituting the optical path length difference adjusting means for adjusting the optical path length difference. Through the mechanism 82 driven by the drive unit 82, the stage 81 moves the object to be measured 9 in directions parallel to the optical axis of the optical system between the half mirror 43 and the object to be measured 9. Here, without moving the lens 24, the optical system between the half mirror 43 and the object to be measured 9 is kept. That is, the distance to the focal plane on the object to be measured 9 side measured from the half mirror 43 is held. The piezoelectric actuator 71 is driven by the drive unit 72, so as to move the mirror 73 in directions parallel to the optical axis of the optical system between the half mirror 43 and the mirror 73. Here, without moving the lens 23, the optical system between the half mirror 43 and the mirror 73 is kept. The operating range of the piezoelectric actuator 71 (first moving means) is narrower than that of the stage 81 (second moving means). The positional accuracy of the piezoelectric actuator 71 is higher than that of the stage 81. As the mechanism 82 for moving the stage 81, long-distance movable piezoelectric actuators and rotary mechanisms driven by stepping motors, for example, can be used.

According to the result of the optical path length difference detection by the displacement detecting unit 62, the control unit 90 controls the optical path length difference adjusting operation by the piezoelectric actuator 71 and stage 81 through the drive units 72, 82 such that the optical path length difference becomes a plurality of target values in sequence. In particular, the control unit 90 causes the stage 81 to perform the moving operation continuously or intermittently such that the amount of movement by the piezoelectric actuator 71 falls within a predetermined range within the operating range at each of the plurality of target values. The control unit 90 also subjects the moving operation by the piezoelectric actuator 71 to a feedback control such that the optical path length difference becomes each target value upon the moving operation by the stage 81 as well according to the result of the optical path length difference detection by the displacement detecting unit 62.

Figure 3:
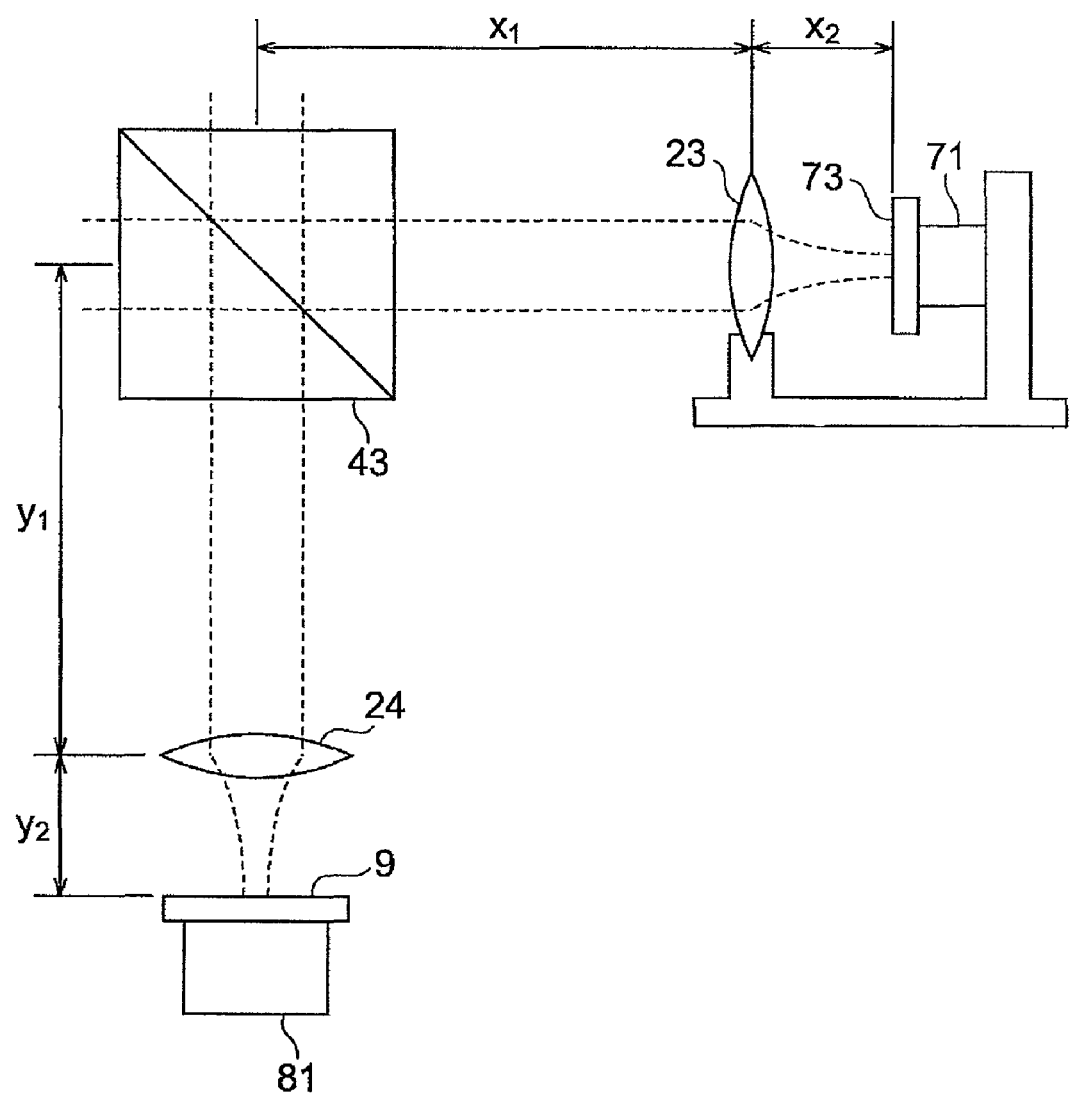
FIG. 3 is a diagram for explaining optical path length difference adjusting operations by a piezoelectric actuator 71 and a stage 81.

FIG. 3 is a diagram for explaining the optical path length difference adjusting operations by the piezoelectric actuator 71 and stage 81. This drawing illustrates the optical system between the half mirror 43 and the mirror 73, the optical system between the half mirror 43 and the object to be measured 9, and the piezoelectric actuator 71 and stage 81 for adjusting the optical path length difference. Let $x_1$ be the distance between the half mirror 43 and the lens 23, and $x_2$ be the distance between the lens 23 and the mirror 73. Let $y_1$ be the distance between the half mirror 43 and the lens 24, and $y_2$ be the distance between the lens 24 and the object to be measured 9. When the object to be measured 9 is constructed as illustrated in FIG. 8, $y_2$ is the distance from the lens 24 to the thin film 92 of the object to be measured 92. The distance $x_2$ is adjusted by the moving operation by the piezoelectric actuator 71. The distance $y_2$ is adjusted by the moving operation by the stage 81. Changing the distance $(x_1+x_2)$ or $(y_1+y_2)$ with the piezoelectric actuator 71 or stage 81 can adjust the optical path length difference $\Delta L$.

If the distance $y_2$ is adjusted alone by the moving operation of the stage 81, the optical path length difference can be adjusted with a wide dynamic range, since the operating range of the stage 81 is relatively wide. In this case, however, the positional accuracy of the stage 81 is relatively low, so that the optical path length difference cannot be adjusted with a high accuracy, whereby the surface form of the object to be measured 9 cannot be measured highly accurately.

If the distance $x_2$ is adjusted alone by the moving operation of the piezoelectric actuator 71, on the other hand, the optical path length difference can be adjusted with a high accuracy, since the positional accuracy of the piezoelectric actuator 71 is relatively high. In this case, however, the operating range of the piezoelectric actuator 71 is relatively narrow, so that the optical path length difference cannot be adjusted in a wide dynamic range, whereby the object to be measured 9 cannot be measured in a wide dynamic range.

If the piezoelectric actuator 71 is caused to perform the moving operation over a wide range though within the operating range thereof, the difference between the focal length of the lens 23 and the distance $x_2$ may increase, so that the focal plane of interfering light produced by the imaging optical system and the imaging surface of the imaging unit 51 may shift greatly from each other, thereby blurring the interference pattern images captured by the imaging unit 51, whereby the surface form of the object to be measured 9 cannot be measured highly accurately.

Therefore, in order to measure the surface form of the object to be measured in a wide dynamic range with a high accuracy, the control unit 90 causes the stage 81 to perform the moving operation continuously or intermittently such that the amount of movement by the piezoelectric actuator 71 falls within a predetermined range within the operating range at each of the plurality of target values in this embodiment. The control unit 90 also subjects the moving operation of the piezoelectric actuator 71 to a feedback control such that the optical path length difference becomes each target value upon the moving operation by the stage 81 as well according to the result of the optical path length difference detection by the displacement detecting unit 62. Two preferred operation modes for each of the piezoelectric actuator 71 and stage 81 will now be explained.

Figure 4:
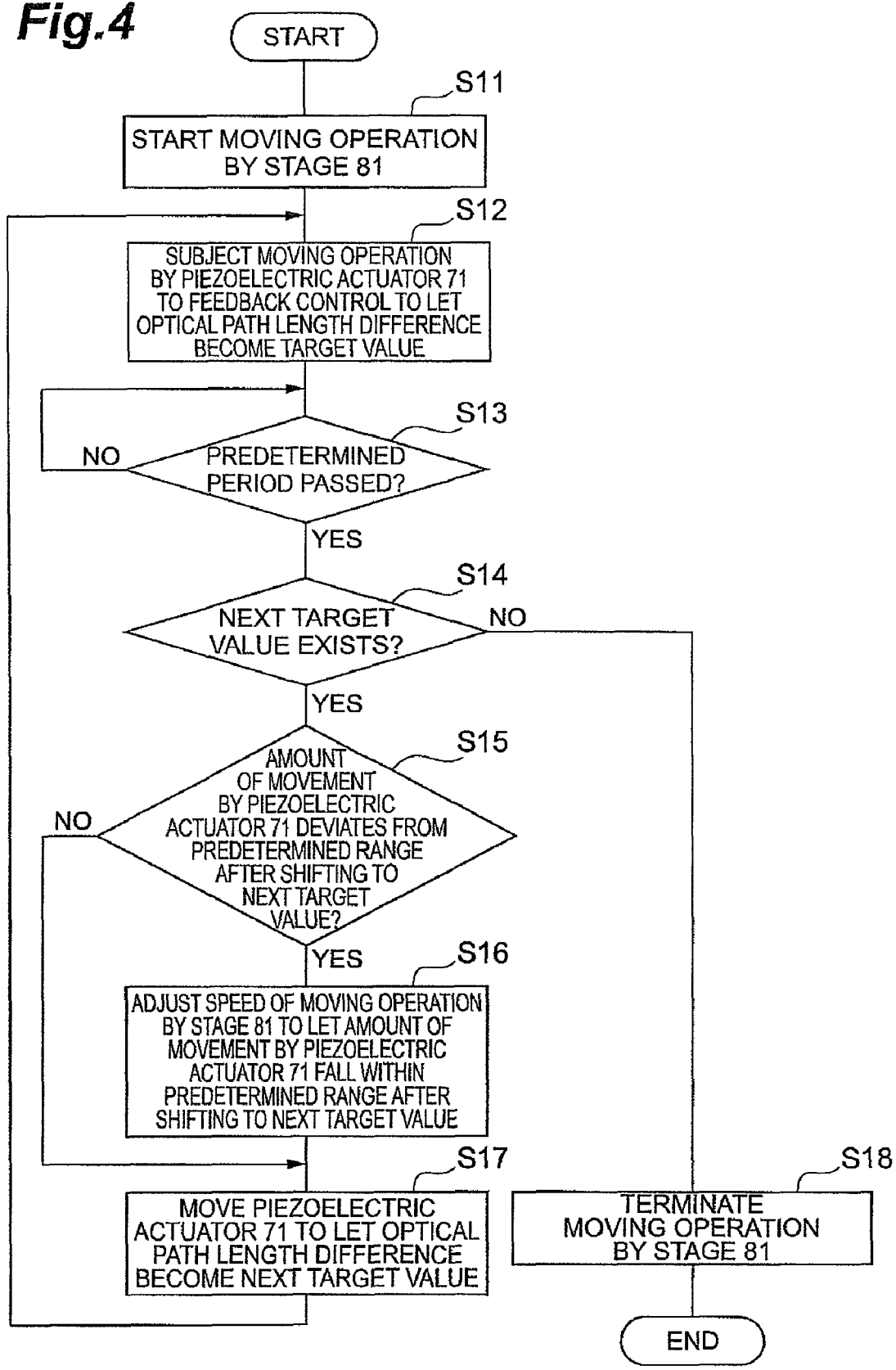
FIG. 4 is a flowchart for explaining a first operation mode of the interference measuring device 1 in accordance with this embodiment.
Figure 5:
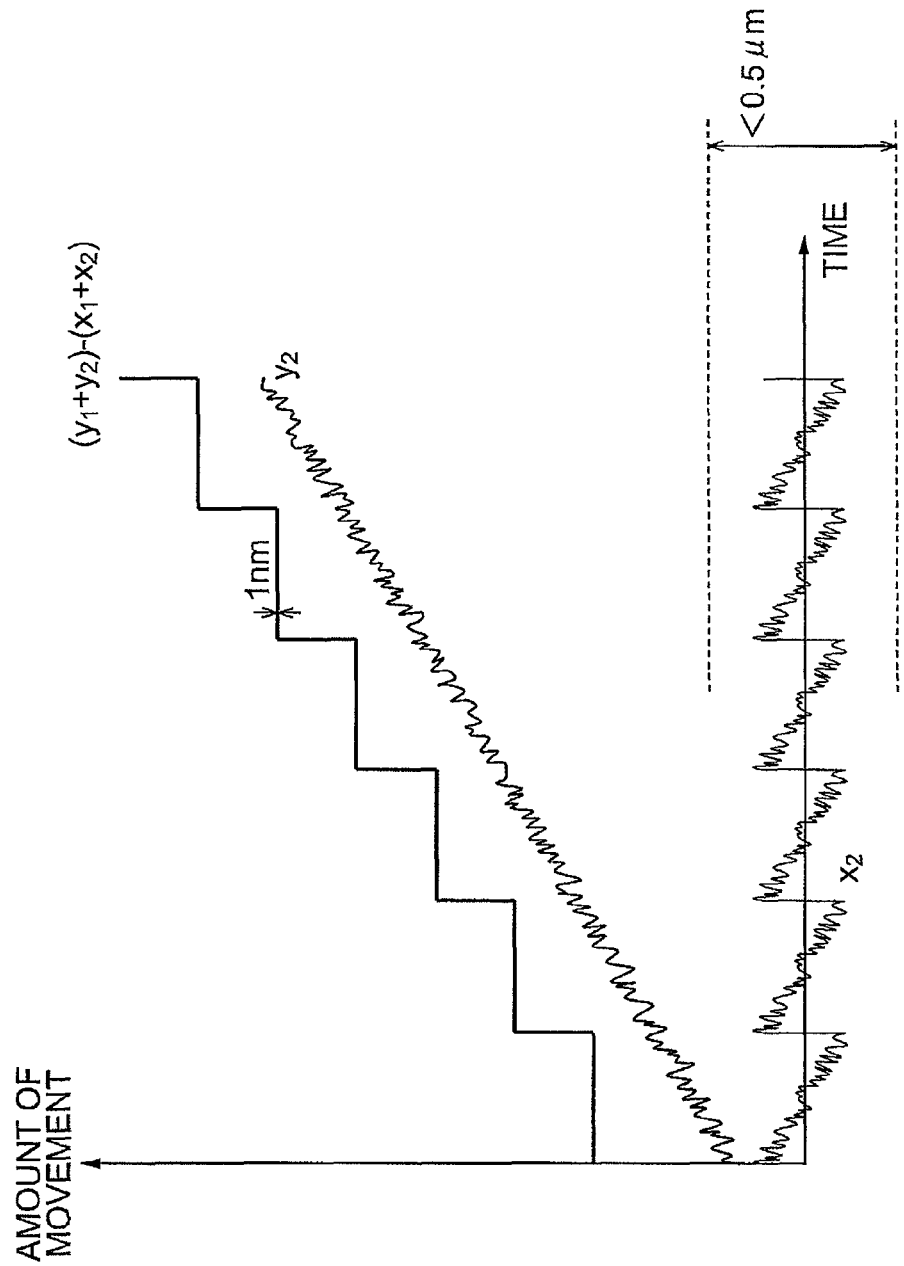
FIG. 5 is a chart illustrating respective changes in distances $x_2$, $y_2$ and optical path length difference $[(y_1+y_2)-(x_1+x_2)]$ with time in the first operation mode in the interference measuring device 1 in accordance with this embodiment.

FIG. 4 is a flowchart for explaining the first operation mode of the interference measuring device 1 in accordance with this embodiment. FIG. 5 is a chart illustrating respective changes in distances $x_2$, $y_2$ and optical path length difference $[(y_1+y_2)-(x_1+x_2)]$ with time in the first operation mode. In the first operation mode, through the drive unit 82, the control unit 90 causes the stage 81 to perform the moving operation continuously.

First, at step S11, the control unit 90 causes the stage 81 to start the moving operation through the drive unit 82. Assuming that the optical path length difference is shifted from a given target value to the next target value at a predetermined time interval $\Delta t$ and letting $\Delta y$ be the amount of change in the distance $y_2$ during the shifting, the moving speed of the stage 81 is set to "$\Delta y/\Delta t$". This changes the distance $y_2$ between the lens 24 and the object to be measured 9 substantially linearly with time. Since the positional accuracy of the stage 81 is relatively low, however, the distance $y_2$ fluctuates relatively greatly with time.

Therefore, at step S12, the control unit 90 subjects the moving operation by the piezoelectric actuator 71 to a feedback control through the drive unit 72 such that the optical path length difference becomes the target value. Here, the piezoelectric actuator 71 adjusts the distance $x_2$, whereby the optical path length difference $[(y_1+y_2)-(x_1+x_2)]$ is set highly accurately.

At step S13, the control unit 90 determines whether or not a fixed time $\Delta t$ has passed since the optical path length difference was set to the given target value, and proceeds to the processing of the subsequent step S14 if the fixed time $\Delta t$ has passed. At step S14, the control unit 90 determines whether the next target value exists or not. If the next target value exists, the control unit 90 proceeds to the processing of the subsequent step S15. If not, the control unit 90 proceeds to the processing of step S18.

At step S15, before the optical path length difference shifts to the next target value, the control unit 90 determines whether or not the amount of movement $x_2$ by the piezoelectric actuator 71 deviates from a predetermined range at the target value after the shifting. If it is determined that the amount of movement $x_2$ deviates from the predetermined range, the control unit 90 proceeds to the processing of step S17 through step S16. If it is determined that the amount of movement $x_2$ falls within the predetermined range, the control unit 90 immediately proceeds to the processing of step S17. At step S16, the control unit 90 adjusts the speed of the moving operation by the stage 81 such that the amount of movement $x_2$ by the piezoelectric actuator 71 falls within the predetermined range after the shifting to the next target value.

At step S17, the control unit 90 sets the optical path length difference to the next target value, and moves the piezoelectric actuator 71 stepwise by $\Delta x$ through the drive unit 72. Thereafter, returning to the processing of step S12, the control unit 90 subjects the moving operation by the piezoelectric actuator 71 to a feedback control through the drive unit 72 such that the optical path length difference becomes a new target value. At step S18, the control unit 90 terminates the moving operation by the stage 81 through the drive unit 82.

Thus, in the first operation mode, the control unit 90 causes the stage 81 to perform the moving operation continuously, makes the piezoelectric actuator 71 perform the moving operation stepwise when the optical path length difference shifts from a given target value to the next target value, and subjects the moving operation by the piezoelectric actuator 71 to a feedback control in a period when the optical path length difference is set to a given target value such that the optical path length difference becomes the target value. Since the control unit 90 controls the respective moving operations of the piezoelectric actuator 71 and stage 81 as such, both the wide dynamic range of the moving operation of the stage 81 and the high positional accuracy of the moving operation of the piezoelectric actuator 71 can be utilized, whereby the surface form of the object to be measured 9 can be measured in a wide dynamic range with a high accuracy.

Before the optical path length difference shifts from a given target value to the next target value, when the amount of movement by the piezoelectric actuator 71 deviates from a predetermined range at the target value after the shifting, the control unit 90 adjusts the speed of the moving operation by the stage 81 such that the amount of movement falls within the predetermined range (steps S15 and S16) in the first operation mode. Since the control unit 90 adjusts the moving speed of the stage 81 as such, the amount of movement by the piezoelectric actuator 71 can be kept within the predetermined range even when the moving speed of the stage 81 and the time interval $\Delta t$ for changing the target value are insufficient in terms of accuracy, whereby high-accuracy measurement of the surface form of the object to be measured 9 can be maintained. Letting N be the number of target values of optical path length difference, if the moving distance at the time of moving the stage 81 at a constant speed of "$\Delta y/\Delta t$" within a time $N \cdot \Delta t$ has a sufficient accuracy (e.g., with an error within the range of $\pm 1$ μm), steps S15 and S16 will be unnecessary, so that the processing of step S17 may be carried out immediately after step S14.

Figure 6:
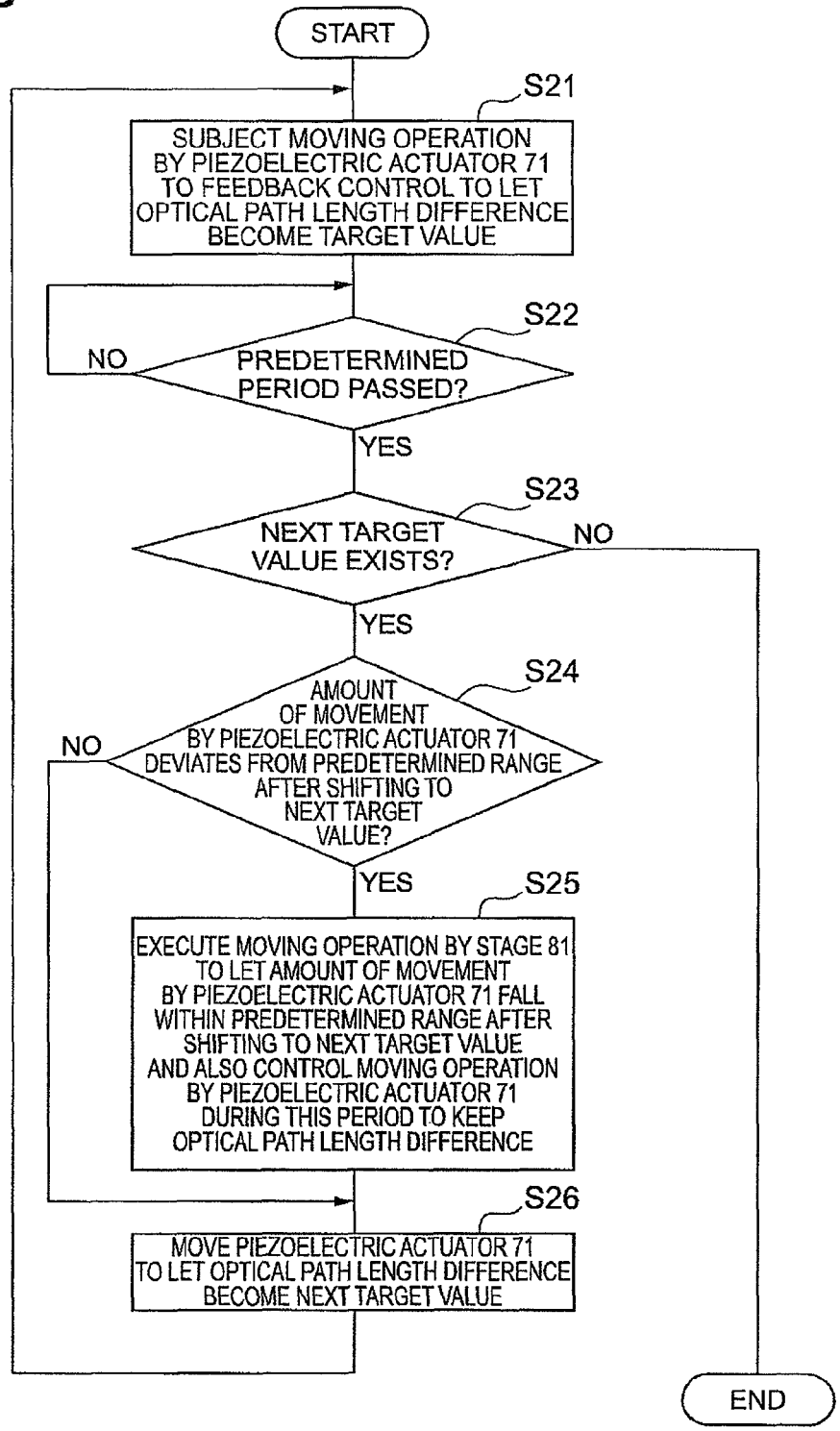
FIG. 6 is a flowchart for explaining a second operation mode of the interference measuring device 1 in accordance with this embodiment.
Figure 7:
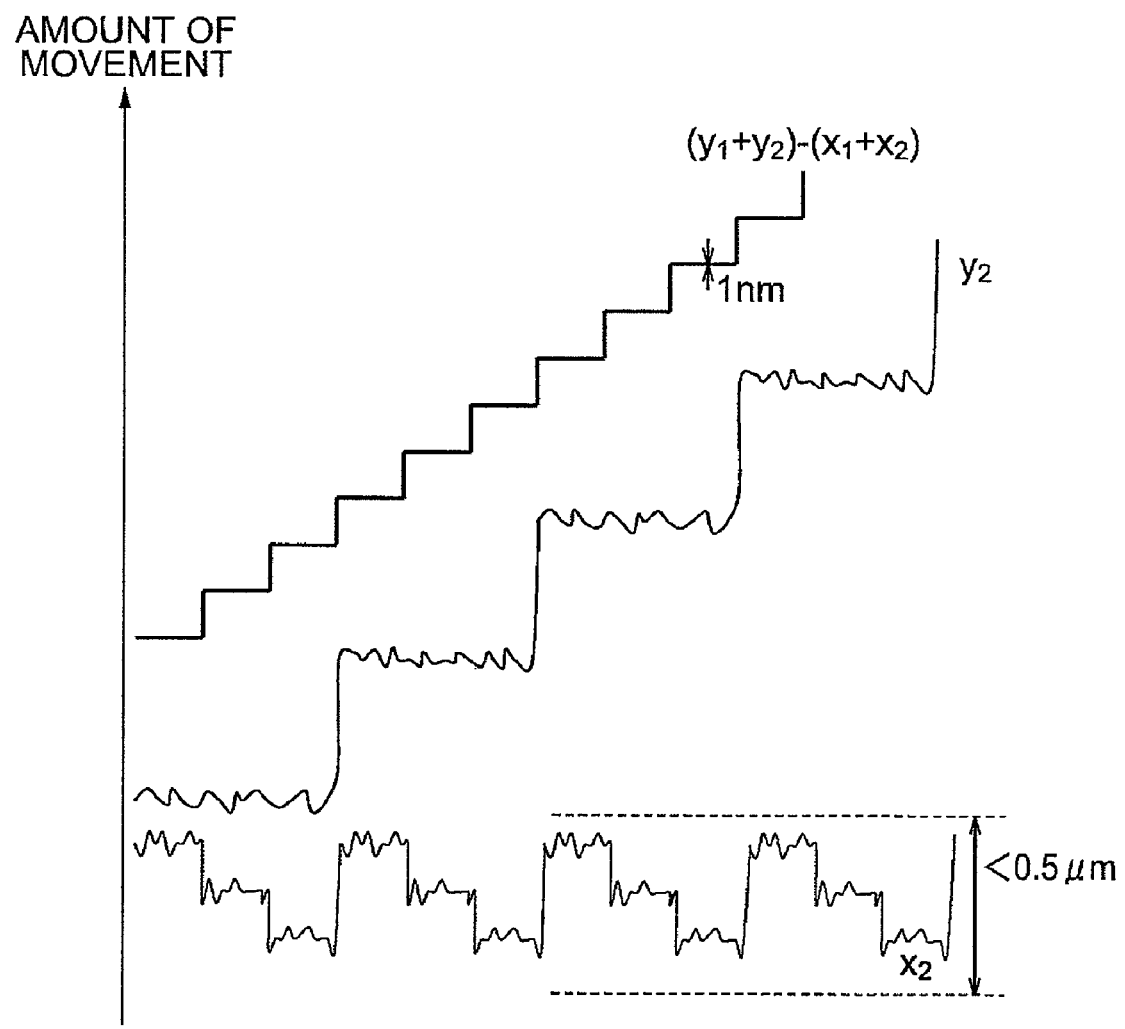
FIG. 7 is a chart illustrating respective changes in distances $x_2$, $y_2$ and optical path length difference $[(y_1+y_2)-(x_1+x_2)]$ with time in the second operation mode in the interference measuring device 1 in accordance with this embodiment.

FIG. 6 is a flowchart for explaining the second operation mode of the interference measuring device 1 in accordance with this embodiment. FIG. 7 is a chart illustrating respective changes in distances $x_2$, $y_2$ and optical path length difference $[(y_1+y_2)-(x_1+x_2)]$ with time in the second operation mode. In the second operation mode, through the drive unit 82, the control unit 90 causes the stage 81 to perform the moving operation intermittently.

At step S21, the control unit 90 subjects the moving operation by the piezoelectric actuator 71 to a feedback control through the drive unit 72 such that the optical path length difference becomes a target value. Here, though the stage 81 is not moved, the positional accuracy of the stage 81 is relatively low, whereby the distance $y_2$ incurs a relatively large fluctuation with time. However, the piezoelectric actuator 71 adjusts the distance $x_2$, so that the optical path length difference $[(y_1+y_2)-(x_1+x_2)]$ is set highly accurately.

At step S22, the control unit 90 determines whether or not a fixed time $\Delta t$ has passed since the optical path length difference was set to the given target value, and proceeds to the processing of the subsequent step S23 if the fixed time $\Delta t$ has passed. At step S23, the control unit 90 determines whether the next target value exists or not. If the next target value exists, the control unit 90 proceeds to the processing of the subsequent step S24. If not, the control unit 90 terminates the operation.

At step S24, before the optical path length difference shifts to the next target value, the control unit 90 determines whether or not the amount of movement $x_2$ by the piezoelectric actuator 71 deviates from a predetermined range at the target value after the shifting. If it is determined that the amount of movement $x_2$ deviates from the predetermined range, the control unit 90 proceeds to the processing of step S26 through step S25. If it is determined that the amount of movement $x_2$ falls within the predetermined range, the control unit 90 immediately proceeds to the processing of step S26.

At step S25, the control unit 90 moves the stage 81 such that the amount of movement $x_2$ by the piezoelectric actuator 71 falls within the predetermined range after the shifting to the next target value and then stops it and, in a period when the stage 81 moves, controls the moving operation by the piezoelectric actuator 71 such that the optical path length difference at this time becomes each target value. In the case where the amount of movement $x_2$ by the piezoelectric actuator 71 exceeds the upper limit of a predetermined range at the next target value when moving the stage 81 at this time, the amount of movement $x_2$ by the piezoelectric actuator 71 is placed near the lower limit of the predetermined range. In the case where the amount of movement $x_2$ by the piezoelectric actuator 71 is less than the lower limit of the predetermined range at the next target value, by contrast, the amount of movement $x_2$ by the piezoelectric actuator 71 is placed near the upper limit of the predetermined range.

At step S26, the control unit 90 sets the optical path length difference to the next target value, and moves the piezoelectric actuator 71 stepwise by $\Delta x$ through the drive unit 72. Thereafter, returning to the processing of step S21, the control unit 90 subjects the moving operation by the piezoelectric actuator 71 to a feedback control through the drive unit 72 such that the optical path length difference becomes a new target value.

Thus, in the second operation mode, the control unit 90 subjects the moving operation by the piezoelectric actuator 71 to a feedback control such that the optical path length difference becomes each target value. Since the control unit 90 controls the respective moving operations of the piezoelectric actuator 71 and stage 81 as such, both the wide dynamic range of the moving operation of the stage 81 and the high positional accuracy of the moving operation of the piezoelectric actuator 71 can be utilized, whereby the surface form of the object to be measured 9 can be measured in a wide dynamic range with a high accuracy: When the positional accuracy of the stage 81 is low, the second operation mode is more effective than the first operation mode.

EXAMPLE 1

A specific example of the second operation mode of the interference measuring device 1 will now be explained. In this example, an SLD light source having an output wavelength $\lambda_2$ of 1330 nm was used as the light source 12. As the piezoelectric actuator 71, AE0505D08 manufactured by NEC TOKIN Corporation was used. As the stage 81, P-611.ZS manufactured by PI GmbH & Co. KG was used. As the imaging unit, C4880-07 manufactured by Hamamatsu Photonics K.K. was used. The width of change between steps of optical path length difference $[(y_1+y_2)-(x_1+x_2)]$ was $\lambda_1/8$ (=about 100 nm). As the semitransparent subject to be measured 93, cultivated cell MCF7 was used. As the substrate 91, a glass slide was used.

First, while focusing the lenses 23, 24 onto the reflecting surface of the mirror 73 and the front face of the substrate 91, respectively, and making the optical path length difference $\Delta L$ (=$(y_1+y_2)-(x_1+x_2)$) fall within the coherence length (about 2 μm) of the light source 11, measurement was started. The mirror 73 or the object to be measured 9 was moved such as to increase the optical path length difference $\Delta L$.

Figure 9:
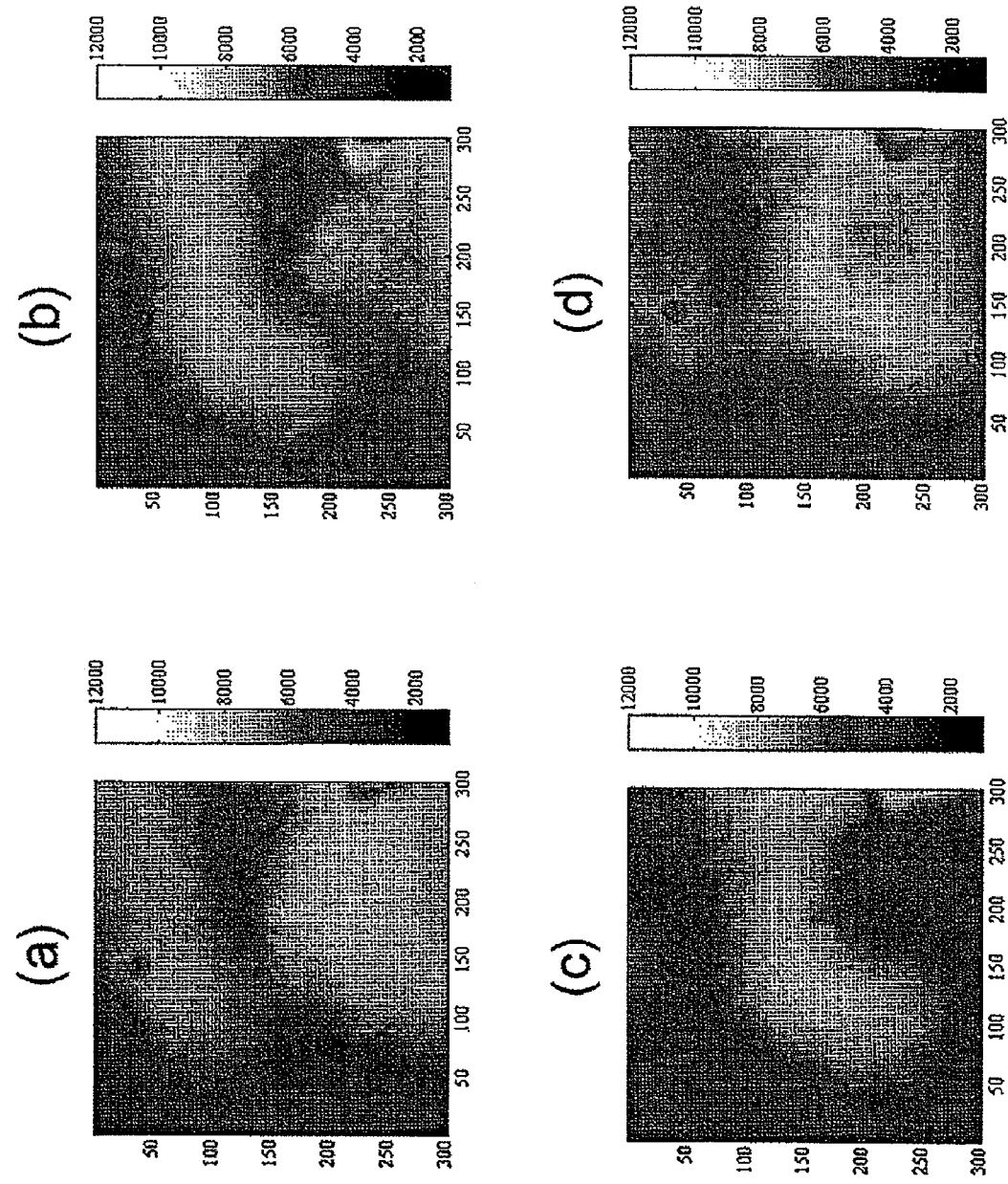
FIGS. 9(a)-(d) is a chart illustrating four consecutive interference images in the earliest period in an example.

FIG. 9 is a chart illustrating four consecutive interference images in the earliest period in this example. Since both focal position and zero optical path length difference position exist on the front face of the substrate 91, interference images caused by light reflected from the front face of the substrate 91 are captured.

Figure 10:
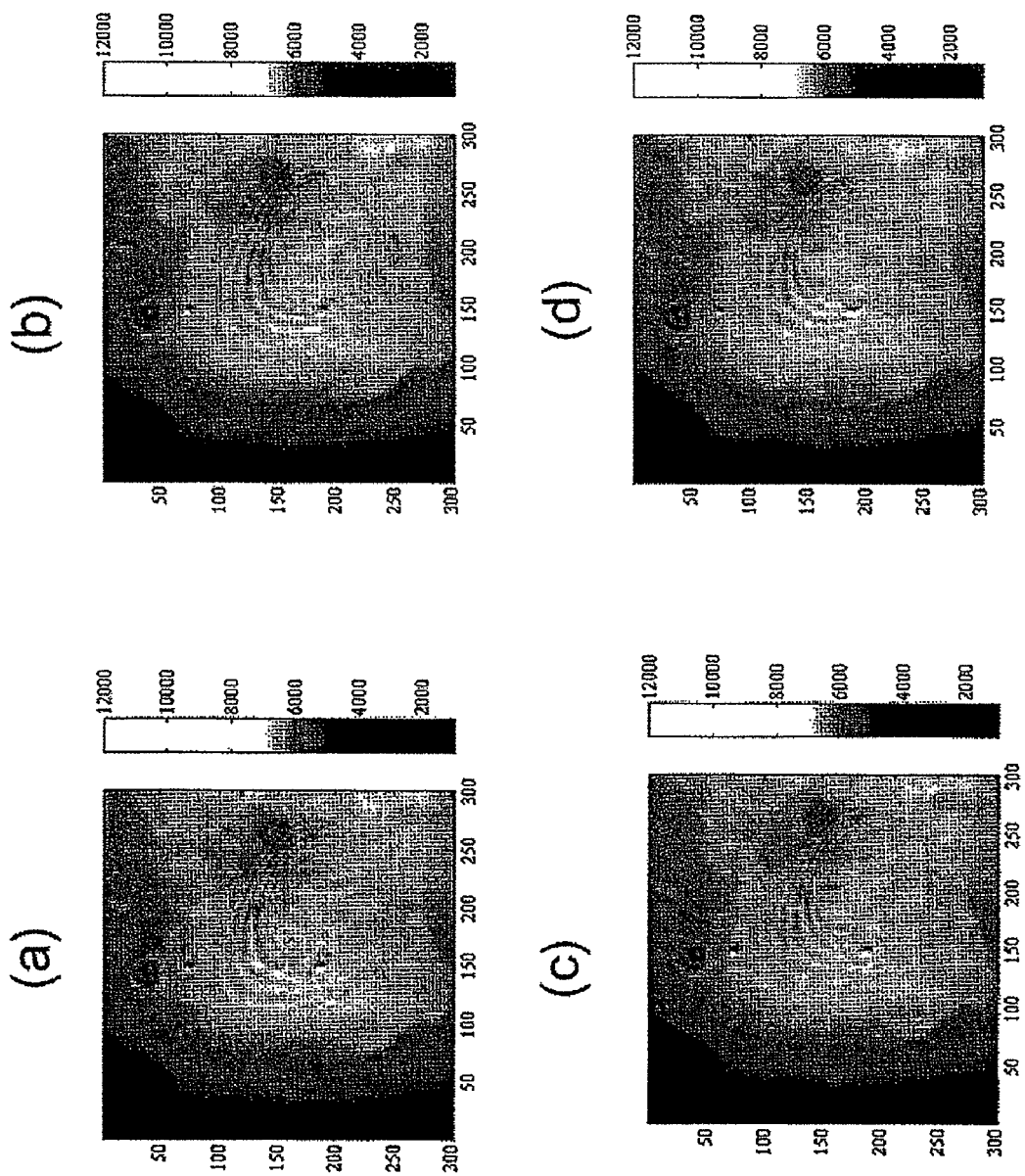
FIGS. 10(a)-(d) is a chart illustrating four consecutive interference images from the 36th to 39th stepwise optical path length difference moving operations after repeating such moving operations for 36 times (by about 3600 nm) in the example.

FIG. 10 is a chart illustrating four consecutive interference images from the 36th to 39th stepwise optical path length difference moving operations after repeating such moving operations for 36 times (by about 3600 nm) in the example. Since both the optical path length and the focus of the lens 24 are shifted from FIG. 9 by 3600 nm at the same time, interference images caused by the light reflected from the front face of the cell 93 positioned 3600 nm above the front face of the substrate 91 are captured with a favorable contrast. Since the optical path length difference was subjected to a feedback control with nanometer-order accuracy, the optical path length difference was precisely moved four times at equally-spaced intervals.

Figure 11:
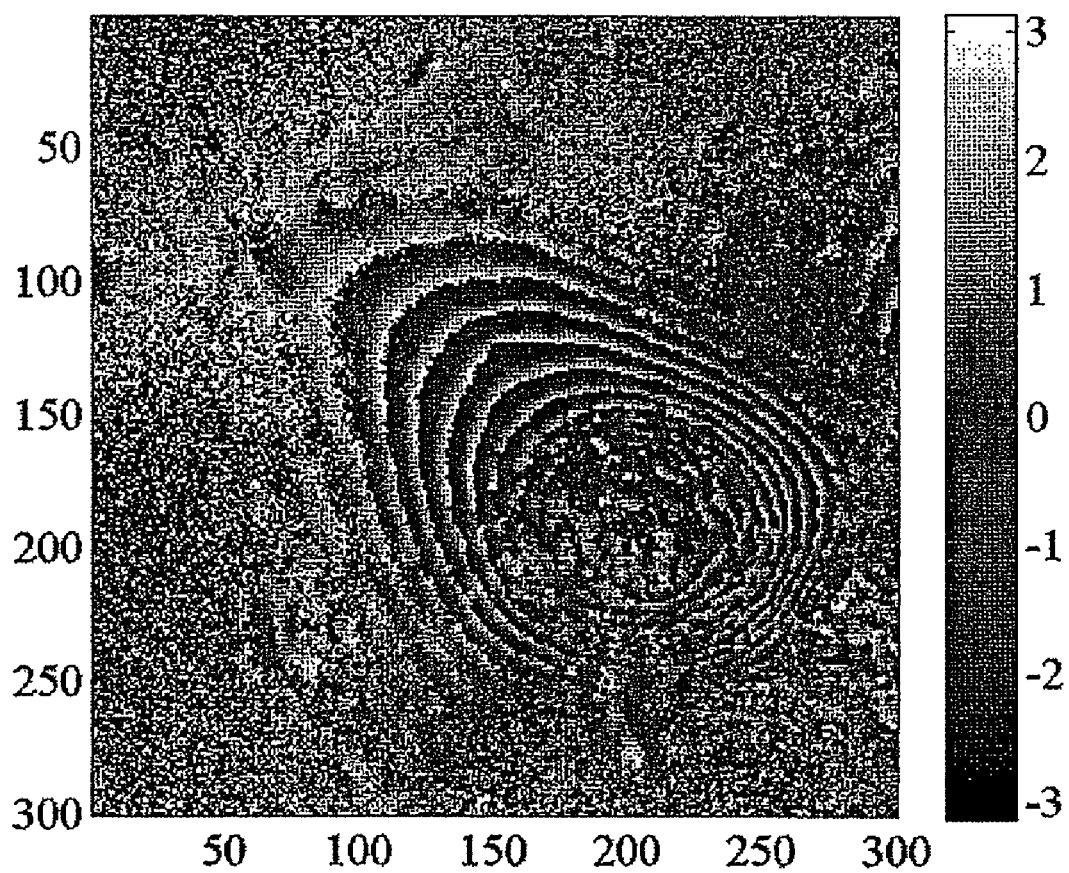
FIG. 11 is a view illustrating a surface form calculated as a phase value by an algorithm of a λ/4 phase-shifting method from the four consecutive interference images from the 36th to 39th operations in the example.

FIG. 11 is a view illustrating a surface form calculated as a phase value by an algorithm of a λ/4 phase-shifting method from the four consecutive interference images from the 36th to 39th operations in the example. The surface form of the cell 93 is imaged as contour lines.

Figure 12:
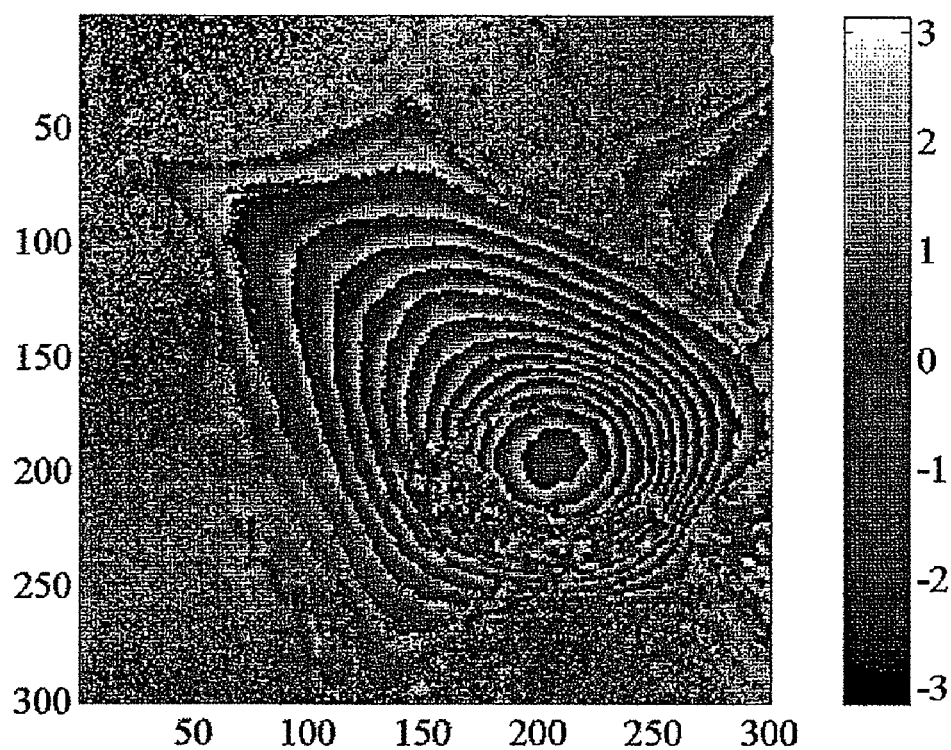
FIG. 12 is a view illustrating a total surface form of a cell produced by determining partial cell surface forms by the algorithm of the λ/4 phase-shifting method from 40 consecutive interference images phase-shifted by λ/4 each and captured in the example and combining these partial cell surface forms together.

FIG. 12 is a view illustrating a total surface form of a cell produced by determining partial cell surface forms by the algorithm of the λ/4 phase-shifting method from 40 consecutive interference images phase-shifted by λ/4 each and captured in the example and combining these partial cell surface forms together. The surface form of the whole cell 93 can be imaged.

INDUSTRIAL APPLICABILITY

The present invention provides an interference measuring device which can measure the surface form of the object to be measured in a wide dynamic range with a high accuracy.

The invention claimed is:

1. An interference measuring device comprising:
a light source for outputting light;
an interference optical system for splitting the light outputted from the light source into two, so as to output first and second branched beams, inputting a first reflected beam occurring when the first branched beam is reflected by a first subject and a second reflected beam occurring when the second branched beam is reflected by a second subject, and causing the first and second reflected beams to interfere with each other, so as to output thus interfering light;
an imaging optical system for focusing the interfering light outputted from the interference optical system;
an imaging unit for capturing an interference pattern of the interfering light focused by the imaging optical system;
optical path length difference detecting means for detecting an optical path length difference between an optical path length from the light source to the imaging unit by way of the first subject and an optical path length from the light source to the imaging unit by way of the second subject;
optical path length difference adjusting means for adjusting the optical path length difference; and
a control unit for controlling an optical path length difference adjusting operation by the optical path length difference adjusting means such that the optical path length difference becomes a plurality of target values in sequence according to a result of the optical path length difference detection by the optical path length difference detecting means;
wherein the optical path length difference adjusting means includes first moving means for moving the first subject and second moving means for moving the second subject and adjusts the optical path length difference by a moving operation by the first or second moving means;
wherein the first moving means has an operating range narrower than that of the second moving means and a positional accuracy higher than that of the second moving means;
wherein the second moving means moves the second subject while keeping an optical system between the interference optical system and the second subject;
wherein the control unit causes the second moving means to perform the moving operation continuously or intermittently such that an amount of movement by the first moving means falls within a predetermined range within the operating range at each of the plurality of target values, and subjects the moving operation by the first moving means to a feedback control such that the optical path length difference becomes each target value upon the moving operation by the second moving means as well according to the result of the optical path length difference detection by the optical path length difference detecting means.

2. An interference measuring device according to claim 1, wherein the control unit causes the second moving means to perform the moving operation continuously;
causes the first moving means to perform the moving operation stepwise when the optical path length difference shifts from a given target value to the next target value; and
in a period when the optical path length difference is set to the given target value, subjects the moving operation by the first moving means to a feedback control such that the optical path length difference becomes the target value.

3. An interference measuring device according to claim 2, wherein, before the optical path length difference shifts from the given target value to the next target value, when the amount of movement by the first moving means deviates from the predetermined range at the target value after the shifting, the control unit adjusts a speed of the moving operation by the second moving means such that the amount of movement falls within the predetermined range.

4. An interference measuring device according to claim 1, wherein the control unit causes the first moving means to perform the moving operation stepwise when the optical path length difference shifts from a given target value to the next target value;
when the amount of movement by the first moving means deviates from a predetermined range within the operating range, causes the second moving means to perform the moving operation intermittently such that the amount of movement falls within the predetermined range; and
subjects the moving operation by the first moving means to a feedback control such that the optical path length difference becomes each target value during the moving operation by the second moving means as well.

* * * * *